US00RE44717E

(19) United States
(12) Reissued Patent
Song et al.

(10) Patent Number: US RE44,717 E
(45) Date of Reissued Patent: Jan. 21, 2014

(54) EDGE DETECTING METHOD

(75) Inventors: Dong-Seob Song, Cheongjo-si (KR); Hyun-Joo Ahn, Suwon-si (KR)

(73) Assignee: Intellectual Ventures II LLC, Wilmington, DE (US)

(21) Appl. No.: 12/770,346

(22) Filed: Apr. 29, 2010
(Under 37 CFR 1.47)

Related U.S. Patent Documents

Reissue of:
(64) Patent No.: 7,366,347
Issued: Apr. 29, 2008
Appl. No.: 11/096,637
Filed: Mar. 30, 2005

(30) Foreign Application Priority Data

May 6, 2004 (KR) ..... 10-2004-0031989

(51) Int. Cl.
*G06K 9/00* (2006.01)
*G06K 9/40* (2006.01)

(52) U.S. Cl.
USPC ..... 382/162; 382/199; 382/254; 382/260; 382/275; 348/252; 348/625; 345/475; 345/606; 358/525; 386/300

(58) Field of Classification Search
None
See application file for complete search history.

(56) References Cited

U.S. PATENT DOCUMENTS

| | | | | |
|---|---|---|---|---|
| 4,561,022 | A | 12/1985 | Bayer | |
| 4,642,676 | A | 2/1987 | Weinger | |
| 4,685,071 | A * | 8/1987 | Lee | 382/162 |
| 5,008,752 | A | 4/1991 | Van Nostrand | |
| 5,093,717 | A | 3/1992 | Sandrew | |
| 5,400,135 | A | 3/1995 | Maeda | |
| 5,475,769 | A | 12/1995 | Wober et al. | |
| 5,588,069 | A | 12/1996 | Katayama et al. | |
| 5,754,678 | A * | 5/1998 | Hawthorne et al. | 382/149 |
| 5,931,960 | A * | 8/1999 | Kletter et al. | 714/704 |
| 6,049,338 | A | 4/2000 | Anderson et al. | |
| 6,115,092 | A | 9/2000 | Greene et al. | |
| 6,181,392 | B1 | 1/2001 | Greene et al. | |
| 6,188,454 | B1 | 2/2001 | Greene et al. | |
| 6,229,578 | B1 * | 5/2001 | Acharya et al. | 348/607 |
| 6,263,101 | B1 * | 7/2001 | Klein | 382/162 |
| 6,348,929 | B1 * | 2/2002 | Acharya et al. | 345/660 |
| 6,587,592 | B2 * | 7/2003 | Georgiev et al. | 382/254 |
| 6,633,297 | B2 * | 10/2003 | McCormack et al. | 345/506 |
| 6,885,766 | B2 * | 4/2005 | Held et al. | 382/167 |
| 6,901,170 | B1 * | 5/2005 | Terada et al. | 382/260 |
| 6,914,628 | B1 * | 7/2005 | Kuwata et al. | 348/272 |
| 7,212,689 | B2 * | 5/2007 | Muresan et al. | 382/300 |

FOREIGN PATENT DOCUMENTS

KR 2001-32809 4/2001

* cited by examiner

*Primary Examiner* — Manav Seth
(74) *Attorney, Agent, or Firm* — McAndrews, Held & Malloy, Ltd.

(57) ABSTRACT

There is provided an edge detecting method, which is capable of preventing a noise influence caused by imaging device and a color interpolation. The edge detecting method includes the steps of: setting a first kernel based on a center pixel in pixel data arranged in a mosaic structure; setting a second kernel based on the center pixel within the first kernel; detecting whether a pixel having a green value in the second kernel is a defective pixel, and correcting the pixel; converting all pixels of the second kernel into pixels having green value; calculating a slope value by using a mask for detecting an edge in the second kernel; and detecting an edge by adding the slope value to a luminance value obtained by a color space conversion.

20 Claims, 6 Drawing Sheets

ExG11 = G22
ExG12 = Median(G13,G22,G24,G33)
ExG13 = G24
ExG21 = Median(G22,G31,G33,G42)
ExG22 = G33
ExG23 = Median(G24,G33,G35,G44)
ExG31 = G42
ExG32 = Median(G33,G42,G44,G53)
ExG33 = G44

ExG11 = Median(G12,G21,G23,G32)
ExG12 = G23
ExG13 = Median(G14,G23,G25,G34)
ExG21 = G32
ExG22 = Median(G23,G32,G34,G54)
ExG23 = G34
ExG31 = Median(G32,G41,G43,G52)
ExG32 = G43
ExG33 = Median(G34,G43,G45,G54)

ExG11 = G22
ExG12 = Average(G13,G22,G24,G33)
ExG13 = G24
ExG21 = Average(G22,G31,G33,G42)
ExG22 = G33
ExG23 = Average(G24,G33,G35,G44)
ExG31 = G42
ExG32 = Average(G33,G42,G44,G53)
ExG33 = G44

ExG11 = Average(G12,G21,G23,G32)
ExG12 = G23
ExG13 = Average(G14,G23,G25,G34)
ExG21 = G32
ExG22 = Average(G23,G32,G34,G54)
ExG23 = G34
ExG31 = Madian(G32,G41,G43,G52)
ExG32 = G43
ExG33 = Average(G34,G43,G45,G54)

EDGE DETECTING METHOD

Matter enclosed in heavy brackets [ ] appears in the original patent but forms no part of this reissue specification; matter printed in italics indicates the additions made by reissue.

FIELD OF THE INVENTION

The present invention relates to a method for processing an image signal; and, more particularly, to a method for detecting an edge of an image signal.

DESCRIPTION OF RELATED ART

An image sensor can be used in various fields, such as a cell phone, a personal computer (PC) camera, a medical science, a toy, and so on. That is, the image sensor is widely used in all fields where an image signal is used.

Such an image sensor captures an image of an object and the captured image is displayed on a screen. A picture quality of the displayed image is largely determined depending on a sharpness of an edge. Accordingly, various correction methods for improving the sharpness of the edge of the image have been proposed.

FIG. 1 is a schematic block diagram of a conventional image sensor.

Referring to FIG. 1, the conventional image sensor includes a control and external system interface 11, a pixel array 10, an analog-to-digital converter (hereinafter, referred to as an ADC) 12, a line memory 13, and an image signal processor 14.

The pixel array 10 includes pixels arranged in an N×M matrix and detects an image information. The control and external system interface 11 controls an overall operation of the image sensor by using a finite state machine (FSM), and manages an interface operation for an external system. The control and external system interface 11 includes a batch register (not shown) so that several internal operations can be programmed. Also, the control and external system interface 11 controls an operation of the entire chip according to the programmed information.

Although not shown in FIG. 1, an analog line buffer detects and stores voltages of selected pixels of one row. A data value of a column selected by a column decoder is transferred to a variable amplifier through an analog bus.

If a pixel voltage stored in the analog line buffer is small, the variable amplifier, for example a programmable gain amplifier (PGA), amplifies the pixel voltage. A color correction is performed on the analog data passing through the variable amplifier. Then, the ADC 12 converts the analog data into a digital value.

The line memory stores the digitalized RGB image signals based on the lines. The image signal processor 14 performs an error correction, a color interpolation, a gamma correction, a color space conversion, and so on.

Meanwhile, a fixed pattern noise occurs in the image sensor due to an offset voltage, which is caused by a minute difference in the manufacturing process. In order to compensate for the fixed pattern noise, the image sensor employs a correlated double sampling (hereinafter, referred to as a CDS), which reads reset voltage signals and data voltage signals from the pixels of the pixel array [11] *10* and outputs a difference therebetween.

As described above, the image signal processor 14 performs a color interpolation, a color space conversion, a gamma correction, and an edge detection and enhancement.

According to a conventional edge detecting and correcting method, a color space conversion is performed to convert an RGB Bayer pattern into an YcbCr pattern space. Among them, a brightness signal Y is used to detect an edge.

The edge detection will now be described briefly.

The brightness signal is stored in the line buffer and is inputted to a first-order differentiator. The first-order differentiator differentiates an image signal to obtain a strength and a direction. Then, the brightness signal is inputted to a second-order differentiator. The second-order differentiator performs the differential to extract an edge of an inputted image signal. At this point, the second-order differentiator obtains only a strength of an edge. The edge extracted by the second-order differentiator forms a closed curve. The extracted edge is transferred to a multiplier. The multiplier multiplies the inputted edge by a preset gain so as to enhance a sharpness of the extracted edge. The information on the edge multiplied by the gain is transferred to a Coring.

The Coring prevents an amplification of noise existing in a low frequency band. That is, the information on the edge having a lower frequency band than a predetermined value is converted into zero. The converted edge information is then transferred to an adder.

The adder adds the converted edge information transferred from the Coring to the inputted image signal and transfers the result to a clipping circuit. The clipping circuit limits the inputted image within a range of 0-255 in its brightness level. The clipped image signal is outputted as an image signal whose edge is enhanced in the sharpness.

However, the conventional edge detecting and correcting method does not consider a noise caused by a detective pixel or the imaging devices (the pixel array 10, the ADC 12 and the line memory 13). Therefore, an unintended edge may be detected.

In addition, since the edge is detected using the brightness signal after the color interpolation, the image signal is affected by noise caused in the color interpolation. Due to this, there is a problem in that a false color caused by the color interpolation is more distinct.

SUMMARY OF THE INVENTION

It is, therefore, an object of the present invention to provide an edge detecting method, which is capable of preventing a noise influence caused by imaging device and a color interpolation and also detecting the edge can be detected without a line memory.

In an aspect of the present invention, there is provided an edge detecting method, including the steps of: setting a first kernel based on a center pixel in pixel data arranged in a mosaic structure; setting a second kernel based on the center pixel within the first kernel; detecting whether a pixel having a green value in the second kernel is a defective pixel, and correcting the pixel; converting all pixels of the second kernel into pixels having green value; calculating a slope value by using a mask for detecting an edge in the second kernel; and detecting an edge by adding the slope value to a luminance value obtained by a color space conversion.

The present invention can detect an edge by using the RGB Bayer signal prior to the color interpolation, without using the brightness signal (Y). Thus, the image is not affected by the noise occurring in the color interpolation. Also, in the edge detection, the noise caused by the detective pixel or the previous-stage imaging devices can be compensated, so that the edge is detected more correctly.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, the present invention will be described in detail with reference to the accompanying drawings.

Figure 1:
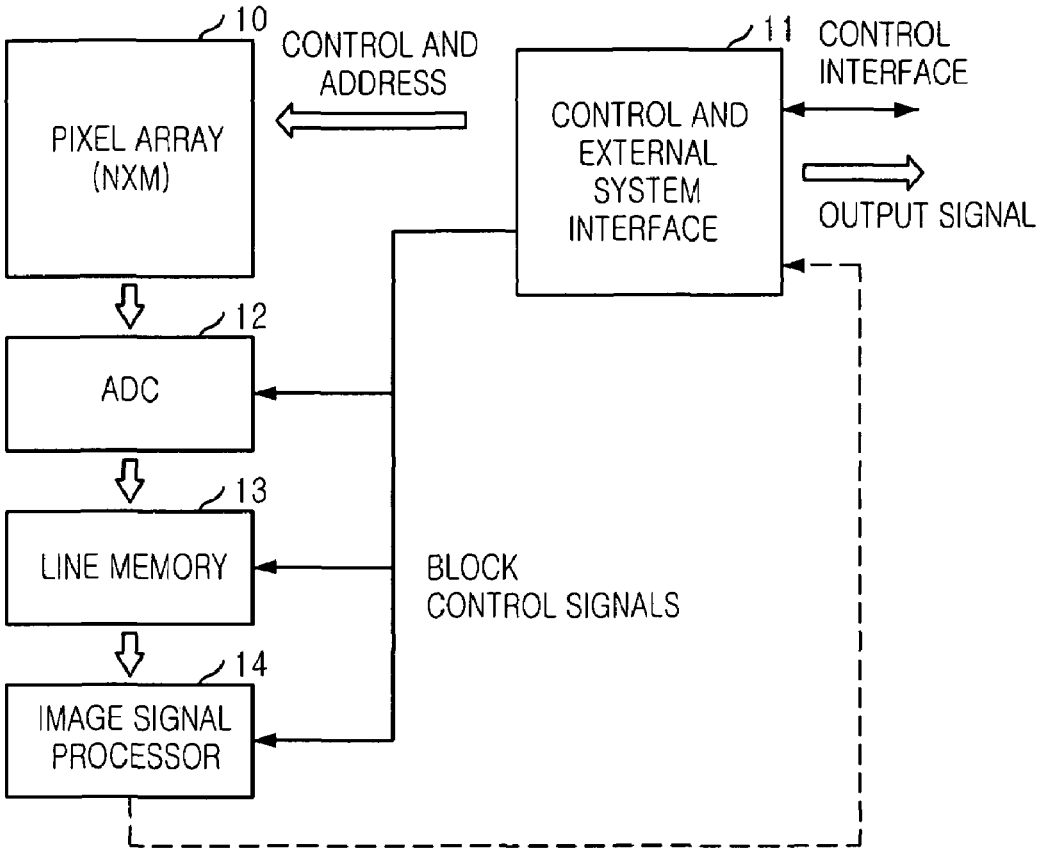
FIG. 1 (PRIOR ART)
FIG. 1 is a schematic block diagram of a conventional image sensor.
Figure 2:
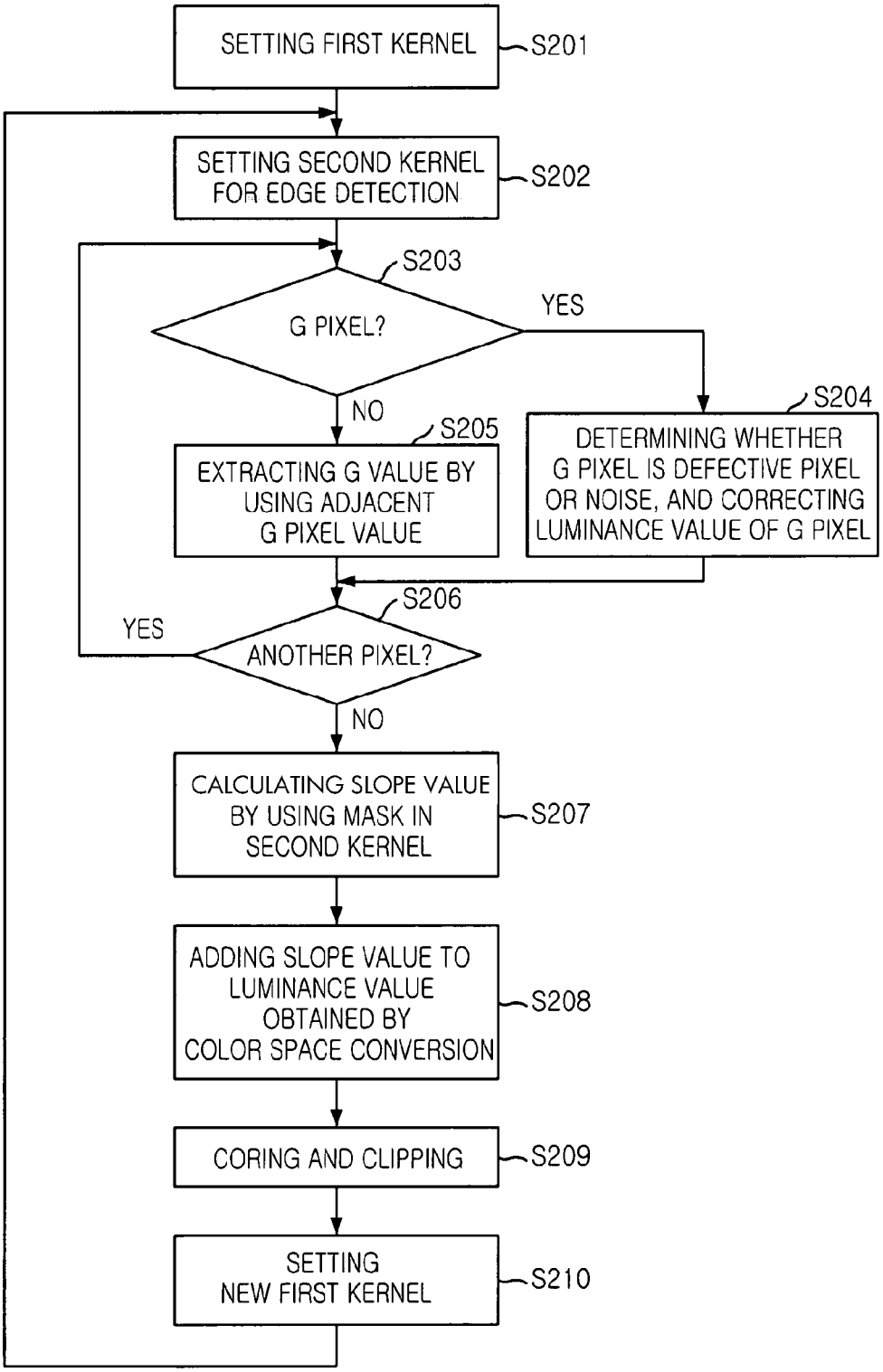
FIG. 2 is a flowchart illustrating an edge detecting method in accordance with an embodiment of the present invention.

FIG. 2 is a flowchart illustrating an edge detecting method in accordance with an embodiment of the present invention.

Referring to FIG. 2, in step S201, a first kernel (for example, a 5×5 kernel) is set based on a center pixel in pixel data of a mosaic arrangement so as to detect an edge. This process is aimed to interpolate a G value because the respective pixels have a luminance value only in one specific color in a color filter array (hereinafter, referred to as a CFA).

In step S202, a second kernel (for example, a 3×3 kernel) is set within the first kernel, based on the center pixel. In step S203, G values of all pixels in the second kernel are interpolated using the G pixel (pixel having a luminance value in a green component) of the first kernel. In this manner, the G value is interpolated and the edge is detected using the interpolated G value. That is, in step S205, all pixels of the second kernel have the G value.

Meanwhile, in step S203, before all pixels of the second kernel have the G value, it is checked whether or not all pixels of the second kernel have the G value.

In step S204, it is checked whether the pixel having the G value is a defective pixel or a noise, and then its luminance value is corrected. In step S206, it is checked whether there is the pixel having no G value. If so, the process returns to the step S203.

In step S207, if all pixels have the G value, a slope value is calculated using several masks for the edge detection in the second kernel. At this point, a Laplacian filter is used.

In step S208, the slope value is added to a luminance value obtained by a color space conversion.

In step S209, a Coring and a clipping are performed to prevent a noise amplification and an overflow of an image signal. In step S210, a new second kernel is set and the above processes are repeated.

Figure 3A:
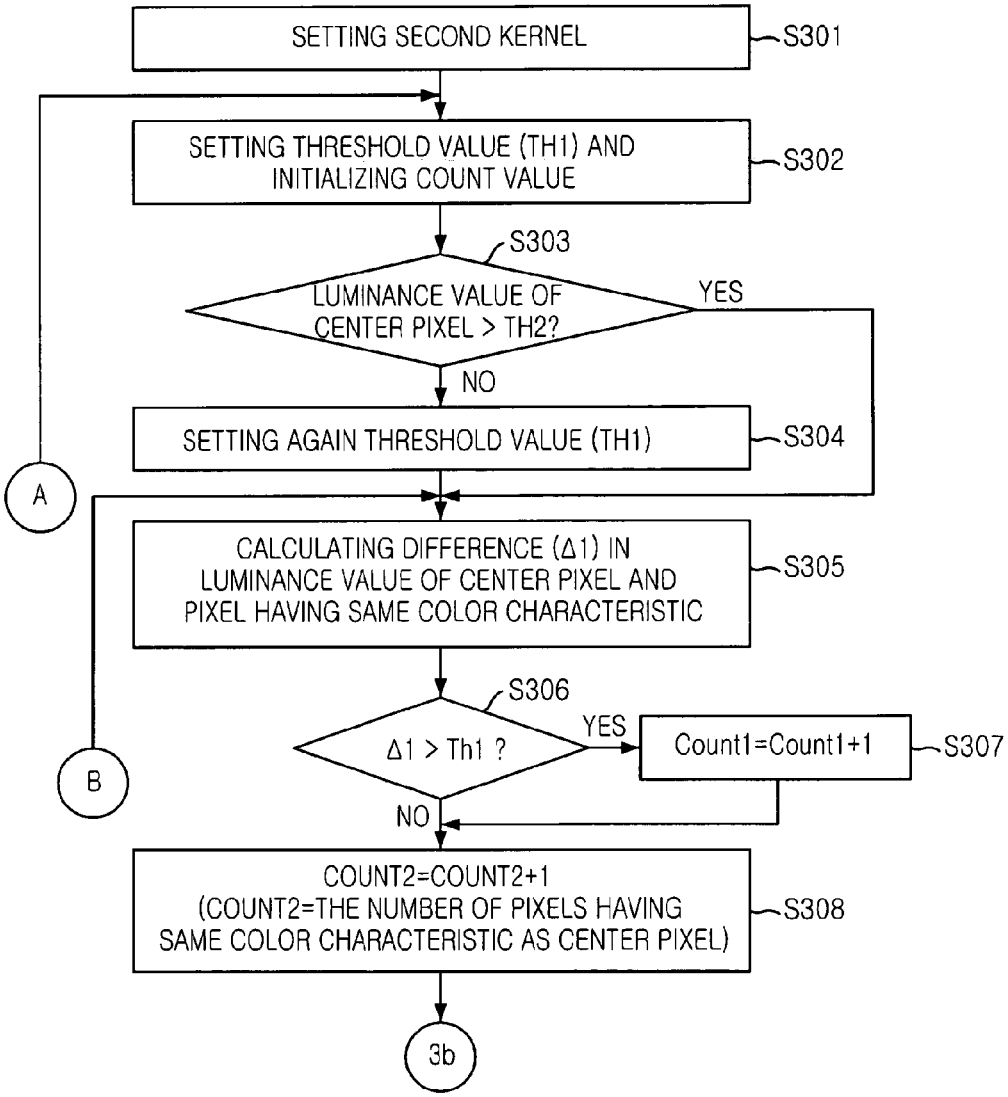
FIGS. 3A and 3B are flowchart illustrating the step S204 of FIG. 2.
Figure 3B:
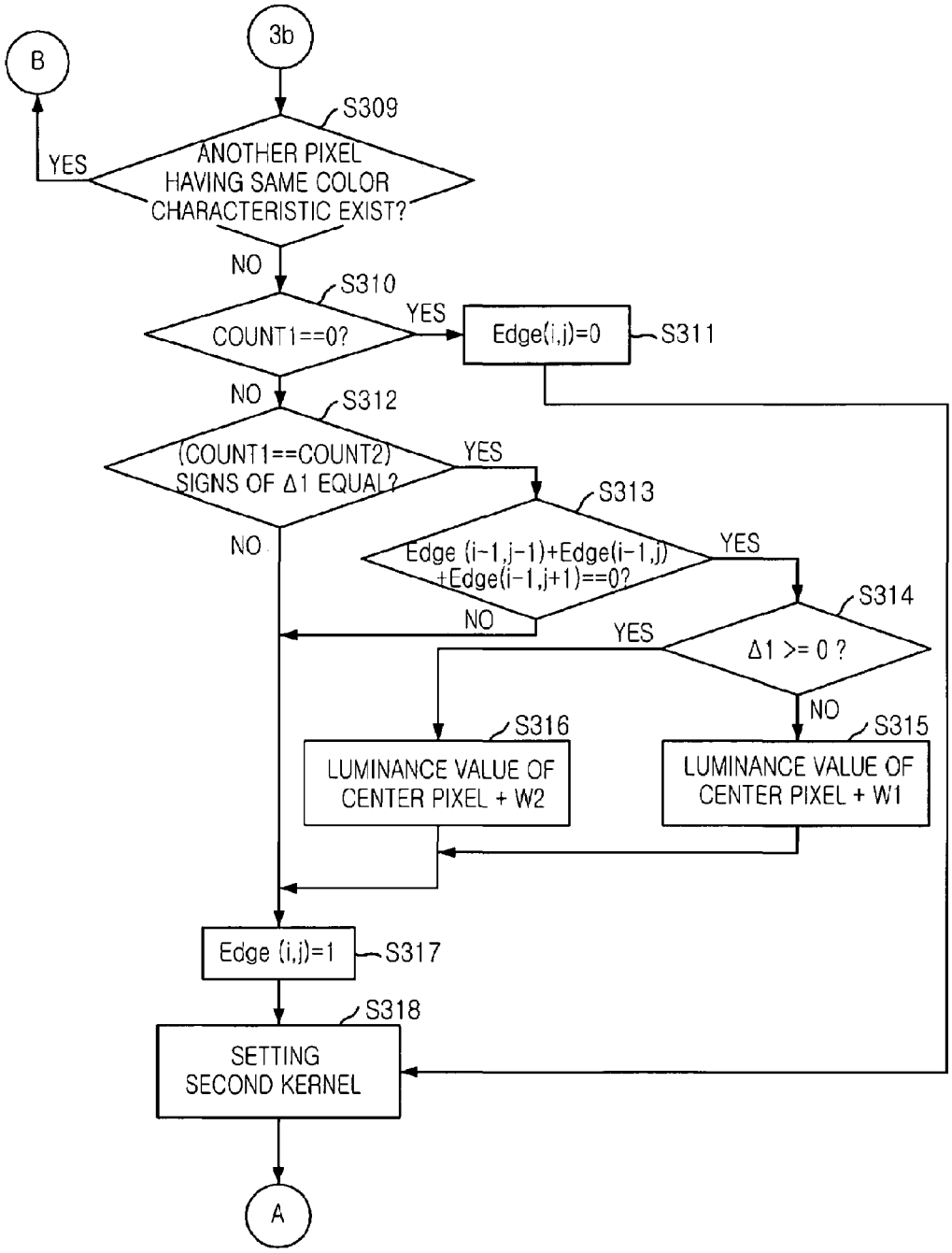

FIGS. 3A and 3B are flowcharts of the step S204 in FIG. 2.

In step S301, a second kernel for correcting a distorted luminance value is set. This step of setting the second kernel is the same as the step S202 of FIG. 2.

In step S302, threshold values Th1 and Th2 are set and all counters are initialized so as to determine whether or not a center pixel having a G value (a luminance value of the center pixel) in the second kernel is distorted.

In step S303, the luminance value of the center pixel is compared with the threshold value Th2. If the luminance value of the center pixel is larger than the threshold value Th2, the process proceeds to step S305. In step S304, if the luminance value of the center pixel is smaller than the threshold value Th2, the threshold value Th1 is again set. That is, the threshold value Th1 is adjusted according to a luminance value of a current pixel. It is because noise cannot be correctly found when the same threshold value is applied regardless of the luminance values of the pixels.

In step S305, if the threshold value Th1 is determined, a difference Δ in the luminance values of the center pixel and the pixel of the second kernel (an adjacent pixel having the same color characteristic) is calculated. In step S307, if the Δ value is larger than the threshold value Th1, a value count1 representing the number of the adjacent pixels whose luminance value is larger than the threshold value increases. In step S308, if the Δ value is smaller than the threshold value Th1, a value count2 representing the number of the pixels whose color characteristic is equal to that of the center pixel increases. In steps S310 and S311, if the value count1 is zero, it is considered that there is no noise and Edge(i, j) is set to zero. Then, in step S318, a next kernel is set.

Here, the value count2 is used to count the number of the adjacent pixels arranged in vertical or horizontal positions with respect to the G pixel (pixel having the luminance value of the G value) to be currently interpolated. The pixel to be interpolated and the adjacent pixels are the pixels contained in the second kernel.

If the value count1 is not zero, the following processes will be performed.

It is assumed that the current center pixel is disposed at an i-th row and a j-th column. In step S312, it is checked whether or not the value count1 and the value count2 are equal to each other and whether differences in the luminance values of the center pixel and the pixels having the same G value are equal to each other.

Here, the row corresponds to a height of the image and the column corresponds to a width of the image. In steps S313 to S316, if the values count1 and count2 are equal to each other and signs of the Δ values for all the adjacent pixels are equal to each other, a weight value is multiplied according to a single (edge) representing whether the pixel luminance value of a (i−1)-th row.

In other words, Edge(i−1, j−1), Edge(i−1, j) and Edge(i−1, j+1) represent whether pixel values of (j−1)-th, j-th and (j+1)-th columns are abnormal (that is, extremely large or [5] *extremely* small). If there is the abnormal value among them and a pixel value of the current i-th row and j-th column is abnormal, the corresponding pixel is considered as an edge and thus is not corrected. If there is no abnormal value in the previous row and the pixel value of the current row is abnormal, the corresponding pixel is considered as a noise and thus is corrected. Also, the reason why the weight value of the distorted signal is different is that a white defect must be corrected with a little large value and a dark defect must be corrected with a little small value.

In step S317, if the two count values is not equal to each other and the signs of the Δ values are not equal to each other, Edge(i, j) becomes 1 and a next kernel is set.

Figure 4:
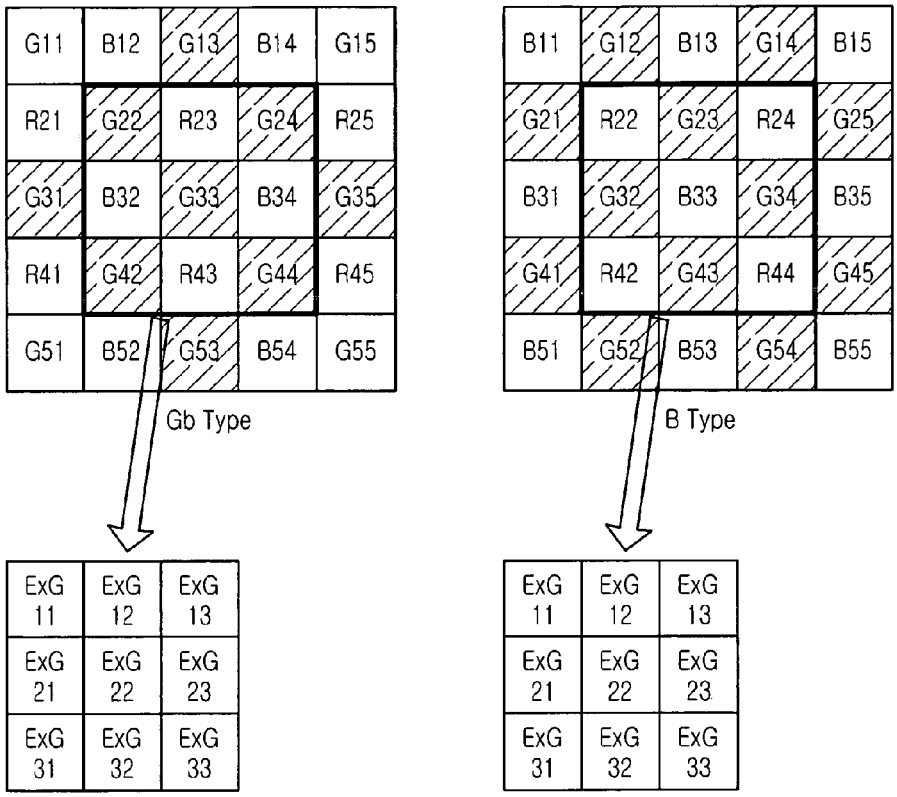
FIG. 4 is an exemplary diagram of a case where G luminance values of R and B pixels are interpolated using G pixels in 5×5 kernel by a median filter.

FIG. 4 is an exemplary diagram of a case where G luminance values of R and B pixels are interpolated using G pixels in 5×5 kernel by a median filter. Here, the R and B pixels represent pixels having luminance values in R and B color components, and the G pixel is a pixel having luminance value in G color component.

In FIG. 4, a G luminance value of a pixel R23 is interpolated in a Gb-type kernel.

In order to calculate a G luminance value ExG12 of the pixel R23 in the Gb-type kernel, luminance values of the adjacent G pixels are required. That is, ExG12 is used as the G luminance value of the pixel R23. Here, the ExG12 is a median output of the luminance values of the four pixels G13, G22, G24 and G33. The median output is obtained by selecting two small luminance values and averaging them. Likewise, the G luminance values E×G21, E×G23 and E×G32 of the pixels B32, B34 and R43 are calculated in the same manner.

Also, in FIG. 4, G luminance values of pixels R22, R24, B33, R42 and R44 are interpolated in a B-type kernel.

Figure 5:
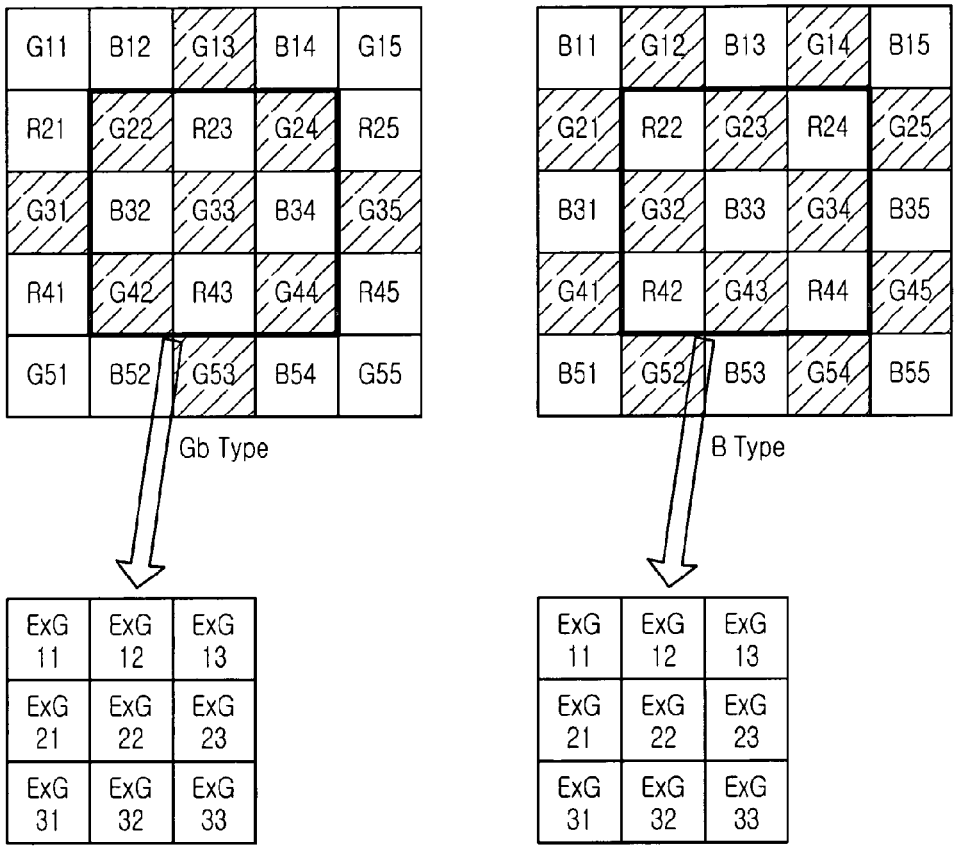
FIG. 5 is another exemplary diagram of a case where G luminance values of R and B pixels are interpolated using an average value.

FIG. 5 is another exemplary diagram of a case where G luminance values of R and B pixels are interpolated using an average value.

In order to interpolate the G luminance value of the pixel R23 in the Gb-type kernel, a difference VDiff1 in luminance values of pixels G13 and G33, a difference VDiff2 in luminance values of pixels G13 and R23, a difference VDiff3 in luminance values of pixels G33 and R23, a difference HDiff1 in luminance values of pixels G22 and G24, a difference HDiff2 in luminance values of pixels G22 and R23, and a difference HDiff3 in luminance values of pixels G24 and R23 are calculated. Then, a sum VDiff of the difference values in a vertical direction and a sum HDiff of the difference values in a horizontal direction are calculated and then their absolute values are calculated as follows:

$$AbsVDiff=abs(VDiff1+VDiff2+VDiff3)$$

$$AbsHDiff=abs(HDiff1+HDiff2+HDiff3)$$

The two absolute values AbsVDiff and AbsHDiff are compared with each other. If the value AbsVDiff is larger than the value AbsHDiff, a value of (G22+G24) is used as the G luminance value of the pixel R23. If the value AbsVDiff is smaller than the value AbsHDiff, a value of (G13+G33) is used as the G luminance value of the pixel R23.

As described above, the present invention can detect an edge by using the RGB Bayer signal prior to the color interpolation, without using the brightness signal (Y). Thus, the image is not affected by the noise occurring in the color interpolation. Also, in the edge detection, the noise caused by the detective pixel or the previous-stage imaging devices can be compensated, so that the edge is detected more correctly.

In addition, the edge detection algorithm and the color interpolation can be achieved at the same time.

The present application contains subject matter related to Korean patent application No. 2004-31989, filed in the Korean Patent Office on May 6, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An edge detecting method comprising the steps of:

a) setting a first kernel based on a center pixel in pixel data arranged in a mosaic structure;

b) setting a second kernel based on the center pixel within the first kernel;

c) detecting whether a pixel having a green value in the second kernel is a defective pixel, and, *if defective,* correcting the pixel;

d) converting all pixels of the second kernel into pixels having green [value] *values*;

e) calculating a slope value by using a mask for detecting an edge in the second kernel; and f) detecting an edge by adding the slope value to a luminance value obtained by a color space conversion.

2. The edge detecting method as recited in claim 1, wherein the first kernel is a 5×5 kernel and the second kernel is a 3×3 kernel.

3. The edge detecting method as recited in claim 1, further comprising the step of:

prior to the step d), determining whether all pixels of the second kernel have [the G value] *green values*.

4. The edge detecting method as recited in claim 3, further comprising the steps of:

checking whether [the pixel having the G value among the pixels] *a pixel* of the second kernel *having the green values* is [a] defective [pixel] or [a] noise; and correcting a luminance value of [the corresponding] *a defective or noise* pixel.

5. The edge detecting method as recited in claim 4, wherein the step of correcting the luminance value of the [corresponding] *defective or noise* pixel includes the steps of:

setting first and second threshold values according to a luminance value of the center pixel so as to determine whether the center pixel having the [G] *green* value in the second kernel is distorted or not;

calculating a difference in luminance values of the center pixel and a pixel having the same [G] *green* value;

comparing the difference with the first threshold value;

if the difference is smaller than the first threshold value, increasing a count value representing the number of pixels having the same color characteristic as the center pixel;

determining whether there exists a pixel having the same color characteristic in a position adjacent to the center pixel;

if there is no pixel having the same color characteristic, determining whether a count value representing the number of adjacent pixels whose difference in the luminance value from the center pixel is larger than the first threshold value is zero; and if the count value is zero, making an edge zero and setting a next 3×3 kernel.

6. The edge detecting method as recited in claim 5, further comprising the steps of:

if the difference in the luminance value is larger than the first threshold value, increasing the count value representing the number of adjacent pixels whose difference in the luminance value from the center pixel is larger than the first threshold value.

7. The edge detecting method as recited in claim 5, further comprising the steps of:

if the count value representing the number of the adjacent pixels whose difference in the luminance value from the center pixel is larger than the first threshold value is not zero, determining whether the count [number] *value* representing the number of the adjacent pixels larger than the first threshold value is equal to the count value representing the number of the pixel having the same color characteristic as the center pixel and whether the differences in the luminance values of the center pixel and the pixel having the same [G] *green* value; and if the condition is satisfied, multiplying a weight value by the luminance value of the center pixel according [to the distortion of] *using distorted* luminance values [of] *derived from* pixels arranged in a previous row.

8. The edge detecting method as recited in claim 7, further comprising the step of:

if the condition is not satisfied, setting the edge to 1 and setting a next second kernel.

9. The edge detecting method as recited in claim 1, wherein the slope value is calculated using a Laplacian filter.

10. The edge detecting method as recited in claim 1, wherein a median filter or an average value is used in the step d).

*11. A method for operating an image sensor comprising:*

*setting a first kernel about a target pixel of an image;*

*setting a second kernel within the first kernel, wherein the second kernel is configured about the target pixel;*

*determining whether the target pixel is a green pixel;*

*correcting the target pixel if it is green and defective;*

*interpolating an effective green value for all non-green pixels of the second kernel using green values of green pixels adjacent each respective non-green pixel; and*

*using the green values and the effective green values of the second kernel to detect an edge of the image.*

*12. The method of claim 11, wherein the first kernel is configured so that the target pixel is centrally disposed within the first kernel.*

*13. The method of claim 11, wherein the second kernel is configured so that the target pixel is centrally disposed within the second kernel.*

*14. The method of claim 11, wherein said correcting the target pixel comprises correcting the target pixel if it is green and defective or green and noise.*

*15. The method of claim 11, wherein said step of using the green values and the effective green values of the second kernel to detect the edge of the image comprises calculating a slope value using a mask for detecting an edge in the second kernel using the green values and the effective green values of the second kernel.*

*16. The method of claim 15, wherein the step of using the green values and effective green values of the second kernel to detect the edge of the image comprises detecting the edge by adding the slope value to a luminance value obtained by a color space conversion operation.*

*17. A method comprising:*

*setting a first kernel and a second kernel, wherein a green pixel is located in the first and second kernels, and wherein the second kernel is configured within the first kernel;*

*setting first and second threshold values based on a luminance value of the green pixel;*

*determining whether the luminance value of the green pixel exceeds the second threshold value;*

*adjusting the first threshold value if the luminance value of the green pixel does not exceed the second threshold value;*

*determining a first luminance difference value between the green pixel and one or more green pixels of the second kernel;*

*increasing a first count value if the first luminance difference is greater than the first threshold value;*

*increasing a second count value; and*

*using the first count value and the second count value to determine whether the green pixel needs correction.*

*18. The method of claim 17, wherein the first kernel is configured so that the target pixel is centrally disposed within the first kernel.*

*19. The method of claim 17, wherein the second kernel is configured so that the target pixel is centrally disposed within the second kernel.*

*20. The method of claim 17, further comprising:*

*correcting the target pixel if it is green and needs correction;*

*interpolating an effective green value for all non-green pixels of the second kernel using green values of green pixels adjacent each respective non-green pixel; and*

*using the green values and the effective green values of the second kernel to detect the edge of an image.*

* * * * *